(12) United States Patent
Choi et al.

(10) Patent No.: US 9,024,869 B2
(45) Date of Patent: May 5, 2015

(54) INPUT APPARATUS OF DISPLAY APPARATUS, DISPLAY SYSTEM AND CONTROL METHOD THEREOF

(75) Inventors: Eun-seok Choi, Suwon-si (KR); Sang-on Choi, Suwon-si (KR); Mi-ra Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 13/552,087

(22) Filed: Jul. 18, 2012

(65) Prior Publication Data
US 2013/0021246 A1     Jan. 24, 2013

(30) Foreign Application Priority Data
Jul. 22, 2011 (KR) ........................ 10-2011-0073059

(51) Int. Cl.
*G09G 5/00* (2006.01)
*H04N 13/02* (2006.01)

(52) U.S. Cl.
CPC .................................. *H04N 13/026* (2013.01)

(58) Field of Classification Search
USPC ............ 345/156–158, 169; 455/556.1, 556.2, 455/566; 715/740, 748, 856–858, 784, 763
See application file for complete search history.

(56) References Cited

U.S. PATENT DOCUMENTS

| | | | |
|---|---|---|---|
| 5,440,326 A | | 8/1995 | Quinn |
| 2005/0243062 A1 | * | 11/2005 | Liberty .......................... 345/158 |
| 2005/0253806 A1 | | 11/2005 | Liberty et al. |
| 2009/0070093 A1 | * | 3/2009 | Nakanishi et al. .............. 703/22 |
| 2011/0037778 A1 | | 2/2011 | Deng et al. |
| 2012/0235905 A1 | | 9/2012 | Meriheinu et al. |
| 2013/0023290 A1 | * | 1/2013 | Rofougaran et al. ...... 455/456.3 |

FOREIGN PATENT DOCUMENTS

| | | |
|---|---|---|
| EP | 1 617 684 A1 | 1/2006 |
| WO | 2006/078249 A1 | 7/2006 |
| WO | 2007/148219 A2 | 12/2007 |
| WO | 2009/013682 A2 | 1/2009 |

OTHER PUBLICATIONS

Communication dated Sep. 24, 2012 issued by the European Patent Office in counterpart European Patent Application No. 12161955.5.
Communication from the European Patent Office issued Apr. 8, 2013 in a counterpart European Application No. 12194917.6.

* cited by examiner

*Primary Examiner* — Jennifer Nguyen
(74) *Attorney, Agent, or Firm* — Sughrue Mion, PLLC

(57) ABSTRACT

An input apparatus of a display apparatus, a display system, and a control method thereof, are provided herein, the input apparatus including: a communication unit which communicates with the display apparatus; a sensing unit which detects angular speed and acceleration from a motion of the input apparatus; a storage unit which stores position information on a position of the input apparatus; and a controller which calculates the motion information based on the detected angular speed and the position information and transmits the calculated motion information through the communication unit if the input apparatus moves, and updates the position information in the storage unit based on the detected acceleration if the input apparatus does not move.

18 Claims, 4 Drawing Sheets

(A)  (B)

INPUT APPARATUS OF DISPLAY APPARATUS, DISPLAY SYSTEM AND CONTROL METHOD THEREOF

CROSS-REFERENCE TO RELATED APPLICATION

This application claims priority from Korean Patent Application No. 10-2011-0073059, filed on Jul. 22, 2011 in the Korean Intellectual Property Office, the disclosure of which is incorporated herein by reference.

BACKGROUND

1. Field

Apparatuses and methods consistent with exemplary embodiments relate to an input apparatus of a display apparatus, a display system, and a control method thereof, and more particularly, to an input apparatus, a display system, and a control method thereof, of a display apparatus which may improve an accuracy of motion information corresponding to motion of the input apparatus if the motion information is transmitted to the display apparatus.

2. Description of the Related Art

A display system is a device which displays images which are based on image signals received from external sources, or images which are autonomously generated, and is constituted by a display apparatus having a display panel onto which images are displayed, as a main part, and a plurality of functionally divided devices. The display system may include various combinations of different apparatuses depending on the desired functions. For example, the display system includes a display apparatus and an input apparatus generating motion information to move a cursor displayed on the display apparatus and transmitting the information to the display apparatus. Such an input apparatus is generally configured as a remote controller of a display apparatus.

An input apparatus may generate motion information in various manners. For example, the input apparatus generates four-direction motion information on a two-dimensional plane, the four-direction motion information corresponding to the number of times of manipulation of four direction keys, such as up, down, right, and left. However, this mode may cause inconvenience to a user in the manipulations required.

Alternatively, an inertia sensor to detect motions of the input apparatus may be applied to the input apparatus. In this case, when a user moves/rotates the input apparatus, holding the input apparatus, a motion vector of the input apparatus is detected and calculated by the inertia sensor. The calculated motion vector is transmitted from the input apparatus to a display apparatus through wireless communication, and the display apparatus moves a cursor corresponding to the received motion vector. Still, better solutions are desired by the user.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment there is provided an input apparatus of a display apparatus, the input apparatus including: a communication unit which communicates with the display apparatus; a sensing unit which detects an acceleration and an angular speed from a motion of the input apparatus; a storage unit which stores position information on a position of the input apparatus; and a controller which calculates motion information based on the detected angular speed and the position information and transmits the calculated motion information through the communication unit if the input apparatus moves, and updates the position information in the storage unit based on the detected acceleration if the input apparatus does not move.

The controller may determine whether the input apparatus moves based on a value of gravitational acceleration.

The controller may determine that the input apparatus does not move if the detected acceleration satisfies a preset condition via comparison with the value of gravitational acceleration.

The position information may include a rotation angle of a current position of the input apparatus with respect to a reference position of the input apparatus in a preset coordinate system.

The controller may calculate a motion vector from the angular speed and converts the calculated motion vector into a reference motion vector in the reference position of the input apparatus based on the rotation angle.

The preset coordinate system may include a triaxial coordinate system.

The calculating of the motion information by the controller may include calculating initial motion information based on the detected angular speed and then correcting the initial motion information based on the position information.

According to an aspect of an exemplary embodiment there is provided a display system including: a display apparatus; and an input apparatus which transmits motion information generated to the display apparatus, wherein the input apparatus comprises a communication unit which communicates with the display apparatus; a sensing unit which detects an acceleration and an angular speed from a motion of the input apparatus; a storage unit which stores position information on a position of the input apparatus; and a controller which calculates motion information based on the detected angular speed and the position information and transmits the calculated motion information through the communication unit if the input apparatus moves, and updates the position information in the storage unit based on the detected acceleration if the input apparatus does not move.

The display apparatus may include a display unit and an image processor, wherein the image processor controls a movement of a cursor displayed on the display unit based on the motion information received from the input apparatus.

According to an aspect of an exemplary embodiment there is provided a control method of a display system which comprises a display apparatus and an input apparatus transmitting motion information generated to the display apparatus, the method including: detecting an acceleration and an angular speed from a motion of the input apparatus; determining whether the input apparatus moves; calculating motion information based on the detected angular speed if the input apparatus moves; and updating position information based on the detected acceleration if the input apparatus does not move.

The control method may further include correcting the calculated motion information based on pre-stored position information corresponding to a position of the input apparatus, wherein the updating of the position information comprises updating the pre-stored position information based on the detected acceleration if the input apparatus does not move.

The determining whether the input apparatus moves may include determining whether the input apparatus moves based on a value of gravitational acceleration.

The determining whether the input apparatus moves based on the value of gravitational acceleration may include determining that the input apparatus does not move if the detected acceleration satisfies a preset condition via comparison with the value of gravitational acceleration.

The position information may include a rotation angle of a current position of the input apparatus with respect to a reference position of the input apparatus in a preset coordinate system.

The calculating of the motion information may include calculating initial motion information based on the detected angular speed and then correcting the initial motion information based on the position information.

The position information may include a rotation angle of a current position of the input apparatus with respect to a reference position of the input apparatus in a preset coordinate system, and wherein the correcting the initial motion information based on the position information comprises calculating a motion vector from the detected angular speed and converting the calculated motion vector into a reference motion vector in the reference position of the input apparatus based on the rotation angle.

The coordinate system may include a triaxial coordinate system.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
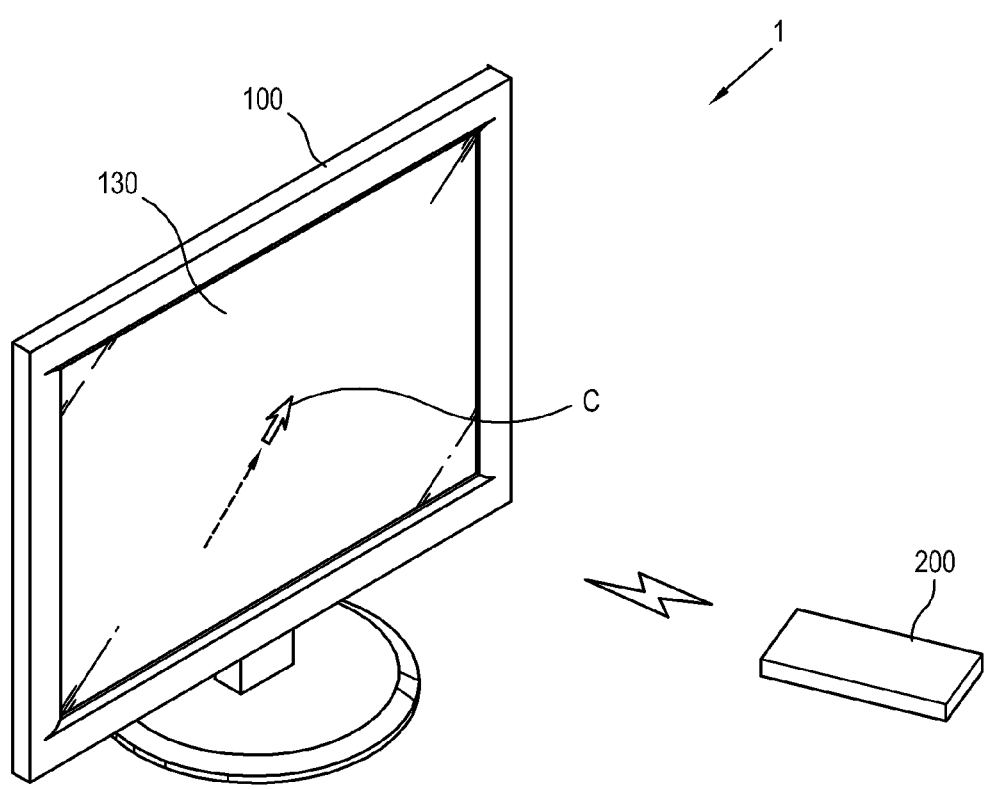
FIG. 1 illustrates an illustrative example of a display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 illustrates an illustrative example of a display system 1 according to an exemplary embodiment.

Referring to FIG. 1, the display system 1 according to the present exemplary embodiment includes a display apparatus 100 processing an image signal according to a preset process to display as an image and an input apparatus 200 generating preset commands/data/information/signals and transmitting to the display apparatus 100 to remotely control the display apparatus 100.

In the display system 1 of the present exemplary embodiment, the display apparatus 100 is provided as a TV, and the input apparatus 200 is provide as a remote controller. Alternatively, the display system 1 may include the display apparatus 100 provided as a monitor connected to a computer main body and the input apparatus 200 communicating with the computer main body. That is, the present exemplary embodiment may be changed and modified variously for desired purposes and is not to be in any way construed as limiting.

The display apparatus 100 displays an image based on an image signal received from the outside on a display unit 130. Examples of images displayed by the display apparatus 100 may include, without being limited to, various images, e.g., videos, still images, applications, and on-screen displays (OSDs). In particular, the display apparatus 100 provides graphic user interfaces (GUIs) for control of various operations, thereby contributing to the convenience for users. The term "unit" as used herein means a hardware component, such as a processor or circuit, and/or a software component that is executed by a hardware component such as a processor.

As in an illustrative GUI, the display apparatus 100 displays a cursor C moving in an image active area on the display unit 130. The cursor C moves based on predetermine motion information processed by the display apparatus 100, and the motion information is generated autonomously by the display apparatus 100 or provided from the outside of the display apparatus 100. When the motion information is provided from the outside, the input apparatus 200 generates the motion information and provides to the display apparatus 100.

The input apparatus 200 is an external device communicating with the display apparatus 100 wirelessly and is held by a user's hand. The input apparatus 200 transmits a preset command to the display apparatus by manipulation of a user.

The input apparatus 200 of the present exemplary embodiment generates motion information corresponding to a motion of the input apparatus 200 by a user and transmits the information to the display apparatus 100. Accordingly, the display apparatus 100 moves the cursor C displayed on the display unit 130 based on the motion information received from the input apparatus 200.

Figure 2:
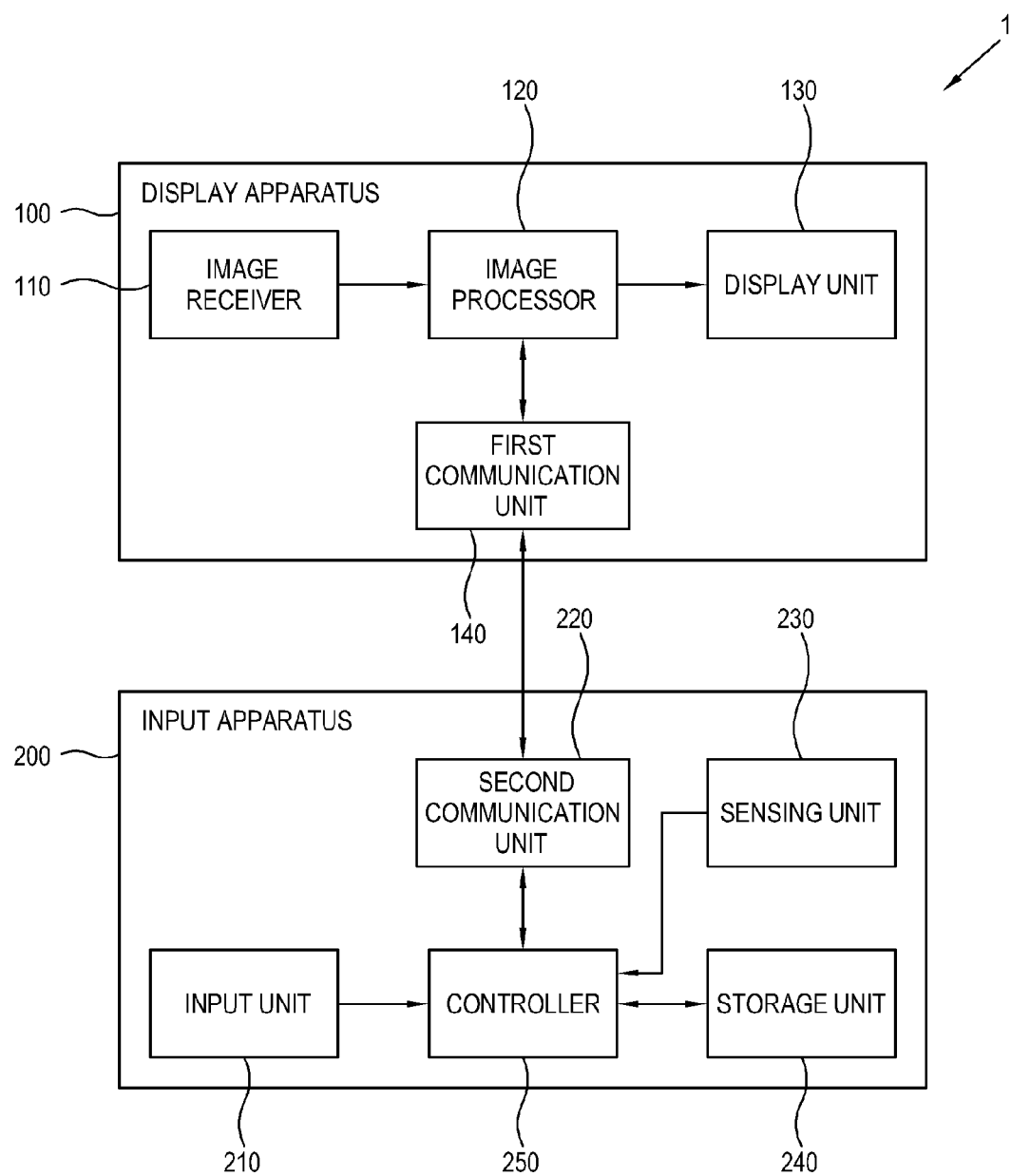
FIG. 2 is a block diagram illustrating a configuration of a display system, an example of which is the display system of FIG. 1.

Hereinafter, configurations of the display apparatus 100 and the input apparatus 200 according to the present exemplary embodiment are described in detail with reference to FIG. 2. FIG. 2 is a block diagram illustrating a configuration of the display system 1.

As shown in FIG. 2, the display apparatus 100 includes an image receiver 110 receiving an image signal, an image processor 120 processing an image signal received by the image receiver 110, the display unit 130 displaying an image based on an image signal processed by the image processor 120, and a first communication unit 140 communicating with external sources.

The input apparatus 200 includes an input unit 120 that is manipulable by a user, a second communication unit 220 communicating with the first communication unit of the display apparatus 100, a sensing unit 230 detecting angular speed and acceleration by motion of the input apparatus 200, a storage unit 240 storing preset data, and a controller 250 controlling calculation and transmission of motion information based on a result of detection by the sensing unit 230.

Hereinafter, the configuration of the display apparatus 100 is described in detail.

The image receiver 110 receives an image signal to transmit to the image processor 120 and may be configured in various modes corresponding to a standard of a received image signal and a type of the display apparatus 100. For example, the image receiver 110 may receive a radio frequency (RF) signal transmitted from a broadcasting station wirelessly, or receive image signals in composite video, component video, super video, Syndicat des Constructeurs d'Appareils Radiorécepteurs et Téléviseurs (SCART), and high definition multimedia interface (HDMI) standards through a wire. When an image signal is a broadcast signal, the image receiver 110 includes a tuner to tune the broadcast signal for each channel.

The image processor 120 performs various types of preset image processing on an image signal. The image processor 120 outputs a processed image signal to the display panel 130, thereby displaying an image on the display panel 130.

For example, the image processor 120 may perform, without being limited to, decoding corresponding to various image formats, de-interlacing, frame refresh rate conversion, scaling, noise reduction to improve image quality, detail enhancement, line scaling, and the like. The image processor 120 may be provided as a separate component to independently perform each process or as an integrated component which is multi-functional, such as a system-on-chip (SOC).

When motion information is received through the first communication unit 140, the image processor 120 moves the cursor C based on the received motion information. The motion information is a vector having both direction and magnitude of motion, and thus the image processor 120 may move the cursor C by a particular pixel value in a particular direction according to the motion information.

The first communication unit 140 transmits commands/data/information/signals received from the input apparatus 200 to the image processor 120. Further, the first communication unit 140 may transmit commands/data/information/signals transmitted from the image processor 120 to the input apparatus 200. The first communication unit 140 enables two-way communication between the display apparatus 100 and the input apparatus 200 and conforms to wireless connectivity standards, such as RF, Zigbee, and Bluetooth, for such communication.

The first communication unit 140 is installed in the display apparatus 100 in the present exemplary embodiment but may be configured as a dongle or module, which may be detachably installed in a connector (not shown) of the display apparatus 100 connected to the image processor 120.

Hereinafter, the configuration of the input apparatus 200 is described in detail.

The input unit 210 is installed on an outside of the input apparatus 200 so that a user manipulates the input unit and is provided as a key, a button, a touch pad, a touch screen, and the like. When a user manipulates the input unit 210, the controller 250 generates a command corresponding to the manipulation and transmits the command through the second communication unit 220. Accordingly, the image processor 120 conducts a control operation corresponding to the command.

The second communication unit 220 transmits a command or motion information generated by the controller 250 to the display apparatus 100 and has a communication protocol corresponding to the first communication unit 140 for transmission. The second communication unit 220 may perform two-way communication with the first communication unit 140.

The sensing unit 230 detects angular speed and acceleration of the input apparatus 200 by motion of the input apparatus 200. The sensing unit 230 measures acceleration and angular speed of the input apparatus 200 in a current position based on three axes and transmits results to the controller 250. Here, three axes refer to width, length, and height, which form a three-dimensional space.

The storage unit 240 stores data to be accessed by the controller 250. In the present exemplary embodiment, the storage unit 240 stores position information, which is read, stored, and updated by the controller 250. The storage unit 240 is configured as a non-volatile memory to retain stored position information. Here, details of position information will be described.

The controller 250 calculates motion information of the input apparatus 200 based on the angular speed and acceleration of the input apparatus 200 detected by the sensing unit 230. The controller 250 corrects the calculated motion information based on position information on the input apparatus 200 and transmits the corrected motion information to the display apparatus 100 through the second communication unit 220.

Figure 3:
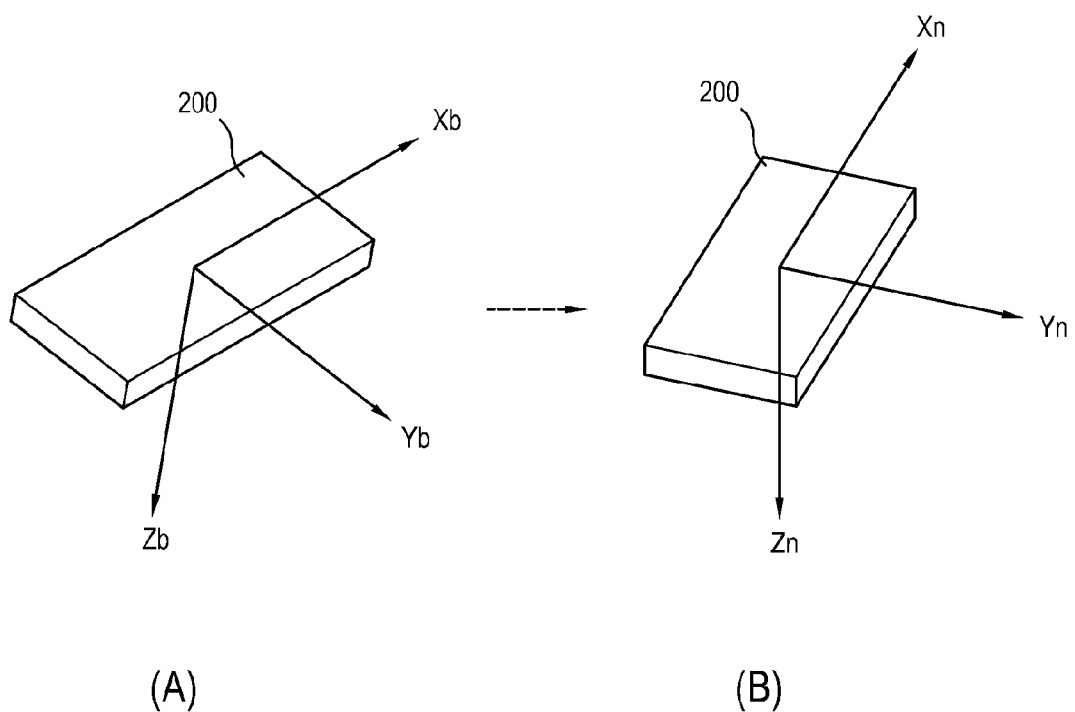
FIG. 3 illustrates a coordinate system of an input apparatus of a display system, an example of which is the display system of FIG. 1.

Hereinafter, a method of the controller 250 generating and correcting motion information is described with reference to FIG. 3. FIG. 3 shows an illustrative coordinate system of the input apparatus 200.

In FIG. 3, (A) is a coordinate system indicating a current position of the input apparatus 200 and (B) is a reference coordinate system indicating a reference position of the input apparatus 200. Here, X, Y, and Z denote axes in space, and subscripts b and n refer to a coordinate system. That is, Xn refers to an x-axis of the reference coordinate system (B). Here, Zn denotes a z-axis of the reference coordinate (B), which is an axis in direction of gravity.

Motion information, i.e., information showing whether the input apparatus 200 actually moves. Motion information may be expressed as a motion vector obtained from an angular speed and an acceleration of the input apparatus 200 detected by the sensing unit 230 based on a current position of the coordinate system.

Position information corresponds to a position of the input apparatus 200, which denotes, for example, a difference between a reference position of the input apparatus 200 and a current position of the input apparatus 200.

The sensing unit 230 detects angular speed and acceleration of the input apparatus 200 in the state (A), and the controller 250 calculates motion information, that is, a motion vector, based on the detected angular speed. However, the axes of the coordinate system (A) may not correspond to the axes of the reference coordinate system (B) respectively depending on a current position of the input apparatus 200. That is, the current position of the input apparatus 200 may form a predetermined rotation angle with respect to a reference position of the input apparatus 200.

When the respective axes of the coordinate systems do not correspond to each other, the controller 250 calculates the rotation angle based on acceleration of the input apparatus 200 and corrects the motion vector based on the calculated rotation angle. That is, the controller 250 converts a motion vector in the coordinate system (A) into a motion vector in the reference coordinate system (B). The corrected motion vector is transmitted to the display apparatus 100.

To correct a motion vector, a method in which angular speed on each axis of the coordinate system (A) is converted into angular speed on each axis of the reference coordinate system (B) using a rotation matrix of a mathematical Inertial Navigation System (INS) may be used, which is described as follows.

The Zn-axis of the reference coordinate system (B) denotes the direction of gravity. The sensing unit 230 measures acceleration and angular speed on each of the X, Y, and Z axes of the coordinate system (A).

Acceleration of the coordinate system (A) is expressed as $A_b=[A_{bx},A_{by},A_{bz}]^T$, which indicates acceleration on each of the X, Y, and Z axes of the coordinate system (A).

Angular speed of the coordinate system (A) is expressed as $\omega_b=[\omega_{bx},\omega_{by},\omega_{bz}]^T$, and angular speed of the reference coordinate system (B) is expressed as $\omega_n=[\omega_{nx},\omega_{ny},\omega_{nz}]^T$, each of which indicates angular speed, while rotating on each of the X, Y, and Z axes of the respective coordinate systems.

Here, a superscript T denotes transposing of a matrix.

Position information on a current position of the input apparatus 200 in the coordinate system (A) may be expressed as Euler angles, that is, roll ($\phi$), pitch ($\theta$), and yaw ($\psi$) angles. The Euler angles are to describe orientation in space, generally known in the art, and thus description thereof is omitted.

A rotation matrix indicating rotation of the coordinate system (A) in the reference coordinate system (B) is expressed using the Euler angles as follows.

$$C_b^n = \begin{bmatrix} \theta_c\psi_c & -\phi_c\psi_s+\phi_s\theta_s\psi_c & \phi_s\psi_s+\phi_c\theta_s\psi_c \\ \theta_c\psi_s & \phi_c\psi_c+\phi_s\theta_s\psi_s & -\phi_s\psi_c+\phi_c\theta_s\psi_s \\ -\theta_s & \phi_s\theta_s & \phi_c\theta_c \end{bmatrix}$$ [Equation 1]

In the matrix, $\phi$, $\theta$, and $\psi$ denote roll, pitch, and yaw angles, and subscripts s and c denote sine and cosine functions, respectively.

Theoretically, assuming that the input apparatus 200 does not move, the Euler angles of the matrix may be calculated by the following equation.

$$\theta = \tan^{-1}\left(\frac{A_{bx}}{\sqrt{A_{by}^2+A_{bz}^2}}\right)$$ [Equation 2]

$$\phi = \tan^{-1}\left(\frac{-A_{by}}{-A_{bz}}\right)$$

$$\psi = 0$$

An equation of converting angular speed $\omega_b$ of the coordination system (A) into angular speed $\omega_n$ of the coordination system (B) using the rotation matrix is as follows.

$$\omega_n = C_b^n \omega_b$$ [Equation 3]

The controller 250 calculates motion information based on angular speed of the input apparatus 200 of the coordinate system (A) and may correct the motion formation to correspond to the reference coordinate system (B) base on acceleration of the input apparatus 200 of the coordinate system (A).

However, while the input apparatus 200 moves, acceleration detected by the sensing unit 230 includes acceleration of gravity and acceleration by motion of the input apparatus 200, which causes an error in the Euler angles, particularly roll and pitch angles. As a result, an error occurs in angular speed $\omega_n=[\omega_{nx},\omega_{ny},\omega_{nz}]^T$ of the reference coordinate system (B).

Thus, in the present exemplary embodiment, the controller 250 determines whether the input apparatus 200 makes motion and selectively calculates, corrects, and transmits motion information on the input apparatus 200 depending on a determination result.

In detail, while the input apparatus 200 moves, the controller 250 calculates and corrects motion information based on angular speed detected by the sensing unit 230 and position information stored in the storage unit 240 and transmits the corrected motion information through the second communication unit 220. However, while the input apparatus 200 does not move, the controller 250 calculates position information on the input apparatus 200 in a current position based on acceleration detected by the sensing unit 230 and updates pre-stored position information in the storage unit 240 to the calculated position information.

That is, while the input apparatus 200 does not move, the controller 250 corrects and stores position information corresponding to changes in position of the input apparatus 200. While the input apparatus 200 moves, the controller 250 does not calculate position information but corrects motion information based on position information already calculated and stored when the input apparatus 200 does not move.

Referring to FIG. 3, when the controller 250 determines that the input apparatus 200 does not move, the controller 250 calculates Euler angles and a rotation matrix based on acceleration of the input apparatus 200 detected by the sensing unit 230 according to in Equations 1 and 2 and stores the Euler angles and the rotation matrix in the storage unit 240.

When the controller 250 determines that the input apparatus 200 moves, the controller 250 calculates angular speed $\omega_n$ using angular speed $\omega_b$ of the input apparatus 200 detected by the sensing unit 230 and a rotation matrix stored in the storage unit 240 according to Equation 3 and transmits the calculated angular speed $\omega_n$ through the second communication unit 220.

Accordingly, correction of motion information based on position information is performed with high accuracy, and fewer operations to calculate position information are involved, thereby reducing loads of the controller 250.

Here, various methods may be used for the controller 250 to determine whether the input apparatus 200 makes motion. For example, the controller 250 may determine whether the input apparatus 200 moves based on the value of gravitational acceleration.

In this case, the controller 250 calculates $A_{norm}$ from an acceleration value detected by the sensing unit 230 according to the following equation.

$$A_{norm} = \sqrt{(A_{bx})^2+(A_{by})^2+(A_{bz})^2}$$ [Equation 4]

When the calculated $A_{norm}$ has a substantially similar value to the value of gravitational acceleration, i.e., 9.8 m/s2, for a preset time, the controller 250 determines that the input apparatus 200 does not move, which is expressed as the following equation.

$$9.8-\alpha < A_{norm} < 9.8+\beta$$ [Equation 5]

Here, $\alpha$ and $\beta$ are constants. In the present exemplary embodiment, the foregoing equation is used to determine whether the input apparatus 20 moves, without being limited thereto.

While the input apparatus 200 moves, the sensing unit 230 detects two acceleration elements including gravitational acceleration and acceleration of the input apparatus due to the motion of the input apparatus 200 itself. However, while the input apparatus 200 does not move, the sensing unit 230 is expected to detect gravitational acceleration only since there is no acceleration due to motion of the input apparatus 200. That is, when the sensing unit 230 detects an acceleration value substantially the same as a value of gravitational acceleration for a preset time, the input apparatus 200 is expected not to move.

Meanwhile, a different method may be used to determine whether the input apparatus 200 moves. For example, when the input apparatus 200 does not move and when the input apparatus 200 moves, the detecting unit 230 may output sensing signals having waveforms with different shapes of profile to the controller 250. Thus, the controller 250 determines that a profile of a waveform of a sensing signal output from the sensing unit 230 corresponds to which case and accordingly may determine whether the input apparatus 200 moves.

Figure 4:
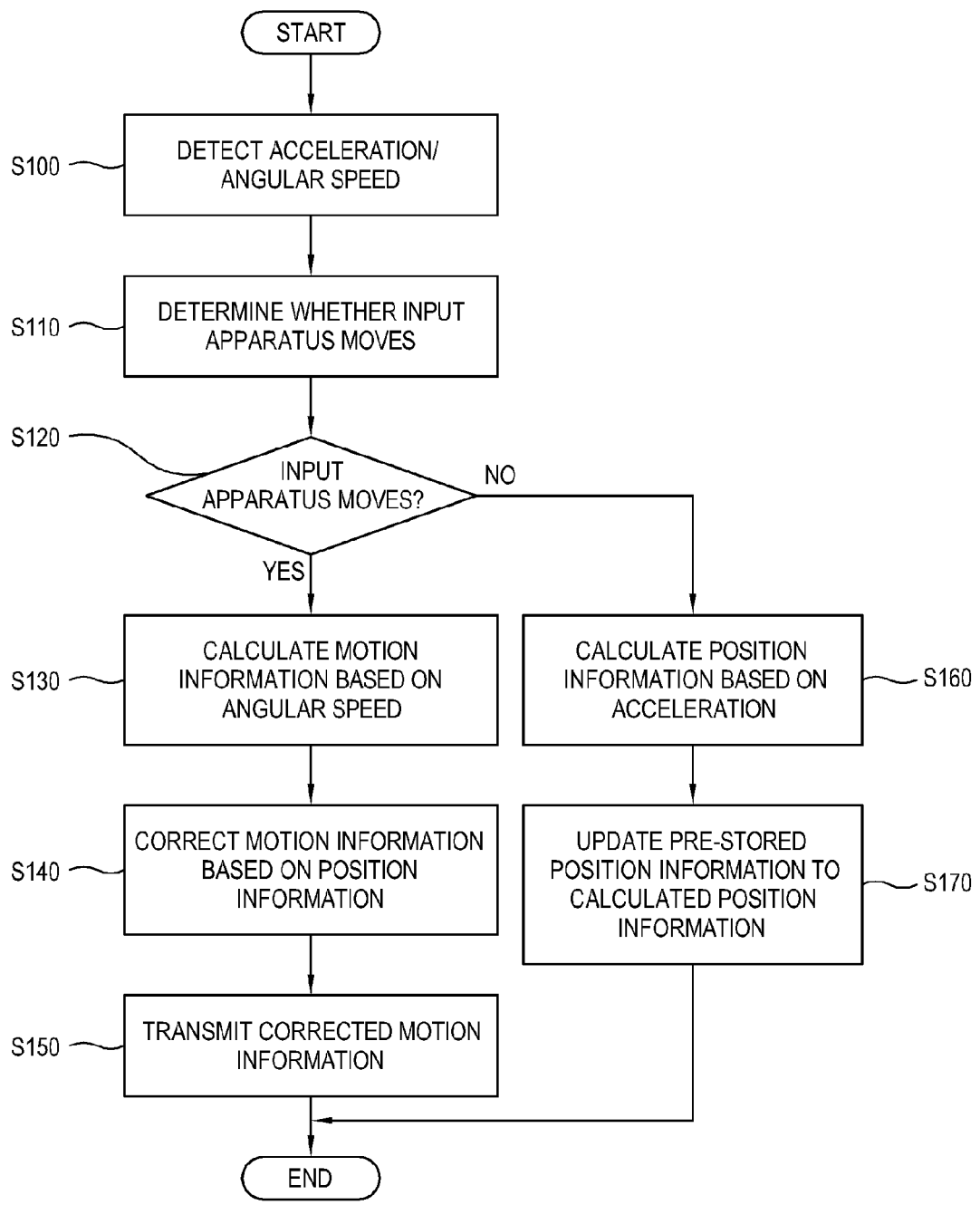
FIG. 4 is a flowchart illustrating a control method of the input apparatus of a display system, an example of which is the display system of FIG. 1.

Hereinafter, a control method of the input apparatus 200 according to the present exemplary embodiment is described with reference to FIG. 4. FIG. 4 is a flowchart illustrating the control method.

As shown in FIG. 4, the sensing unit 230 detects acceleration and angular speed of the input apparatus 200 (S100). The controller 250 determines whether the input apparatus 200 moves based on a result of detection by the sensing unit 230 (S110).

When the input apparatus 200 is determined to move (S120), the controller 250 calculates motion information based on the detected angular speed (S130). Then, the controller 250 corrects the motion information based on position information previously stored in the storage unit 240 (S140). The controller 250 transmits the corrected motion information to the display apparatus 100 (S150).

However, when the input apparatus 200 is determined not to move, the controller 250 calculates position information based on the detected acceleration (S160). The controller 250 updates pre-stored position information in the storage unit 240 to the calculated position information (S170).

According to this procedure, accuracy of motion information transmitted from the input apparatus 200 to the display apparatus 100 may be improved, while loads of operations to correct motion information may be reduced.

Although a few exemplary embodiments have been shown and described, it will be appreciated by those skilled in the art that changes may be made in these exemplary embodiments without departing from the principles and spirit of the inventive concept. For example, the above exemplary embodiments are described with a TV as an illustrative example, but the display apparatus of the exemplary embodiments may be configured as a smart phone, a mobile phone, and the like.

What is claimed is:

1. An input apparatus of a display apparatus, the input apparatus comprising:
a communication unit configured to communicate with the display apparatus;
a sensing unit configured to detect an acceleration and an angular speed from a motion of the input apparatus;
a storage unit configured to store position information on a position of the input apparatus; and
a controller configured to calculate, without calculating position information, motion information based on the detected angular speed and the stored position information and transmit the calculated motion information through the communication unit when the input apparatus moves, and to update the stored position information in the storage unit corresponding to changes in the position of the input apparatus when the input apparatus does not move.

2. The input apparatus of claim 1, wherein the controller is further configured to determine whether the input apparatus moves based on a value of gravitational acceleration.

3. The input apparatus of claim 2, wherein the controller is further configured to determine that the input apparatus does not move when the detected acceleration satisfies a preset condition via comparison with the value of gravitational acceleration.

4. The input apparatus of claim 1, wherein the position information comprises a rotation angle of a current position of the input apparatus with respect to a reference position of the input apparatus in a preset coordinate system.

5. The input apparatus of claim 4, wherein the controller is further configured to calculate a motion vector from the angular speed and convert the calculated motion vector into a reference motion vector in the reference position of the input apparatus based on the rotation angle.

6. The input apparatus of claim 4, wherein the preset coordinate system comprises a triaxial coordinate system.

7. The input apparatus of claim 1, wherein controller is configured to calculate the motion information by calculating initial motion information based on the detected angular speed and then correcting the initial motion information based on the position information.

8. A display system comprising:
a display apparatus; and
an input apparatus configured to transmit motion information generated to the display apparatus,
wherein the input apparatus comprises:
communication unit configured to communicate with the display apparatus; a sensing unit configured to detect an acceleration and an angular speed from a motion of the input apparatus;
a storage unit configured to store position information on a position of the input apparatus; and
a controller configured to calculate, without calculating position information, motion information based on the detected angular speed and the stored position information and transmit the calculated motion information through the communication unit when the input apparatus moves, and to update the stored position information in the storage unit corresponding to changes in the position of the input apparatus when the input apparatus does not move.

9. The display system of claim 8, wherein the display apparatus comprises a display unit and an image processor, wherein the image processor is configured to control a movement of a cursor displayed on the display unit based on the motion information received from the input apparatus.

10. A control method of a display system which comprises a display apparatus and an input apparatus transmitting motion information generated to the display apparatus, the method comprising:
detecting an acceleration and an angular speed from a motion of the input apparatus;
determining whether the input apparatus moves;
calculating, without calculating position information, motion information based on the detected angular speed and stored position information when the input apparatus moves; and
updating the stored position information corresponding to changes in the position of the input apparatus when the input apparatus does not move.

11. The control method of claim 10, further comprising correcting the calculated motion information based on pre-stored position information corresponding to a position of the input apparatus, wherein the updating of the position information comprises updating the pre-stored position information based on the detected acceleration when the input apparatus does not move.

12. The control method of claim 10, wherein the determining whether the input apparatus moves comprises determining whether the input apparatus moves based on a value of gravitational acceleration.

13. The control method of claim 12, wherein the determining whether the input apparatus moves based on the value of gravitational acceleration comprises determining that the input apparatus does not move when the detected acceleration satisfies a preset condition via comparison with the value of gravitational acceleration.

14. The control method of claim 10, wherein the position information comprises a rotation angle of a current position of the input apparatus with respect to a reference position of the input apparatus in a preset coordinate system.

15. The control method of claim 10, wherein the calculating of the motion information comprises calculating initial motion information based on the detected angular speed and then correcting the initial motion information based on the position information.

16. The control method of claim 15, wherein the position information comprises a rotation angle of a current position of the input apparatus with respect to a reference position of the input apparatus in a preset coordinate system, and
   wherein the correcting the initial motion information based on the position information comprises calculating a motion vector from the detected angular speed and converting the calculated motion vector into a reference motion vector in the reference position of the input apparatus based on the rotation angle.

17. The control method of claim 10, wherein the coordinate system comprises a triaxial coordinate system.

18. The control method of claim 17, wherein the triaxial coordinate system has a width, a length and a height.

* * * * *